(12) United States Patent
Ishino

(10) Patent No.: US 6,476,159 B1
(45) Date of Patent: Nov. 5, 2002

(54) GELCOAT COMPOSITION

(75) Inventor: Yuichi Ishino, Musashimurayama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/639,993

(22) Filed: Aug. 16, 2000

(30) Foreign Application Priority Data

Aug. 23, 1999 (JP) ............................................ 11-235241
May 25, 2000 (JP) ....................................... 2000-154110

(51) Int. Cl.[7] .............................................. C08L 83/07
(52) U.S. Cl. ........................ 525/474; 525/476; 525/479; 525/165; 528/32
(58) Field of Search ................................ 525/474, 476, 525/165, 479; 528/32

(56) References Cited

U.S. PATENT DOCUMENTS

| 3,577,263 A | | 5/1971 | Nordstrom |
| 3,709,956 A | | 1/1973 | Nordstrom |
| 5,959,038 A | * | 9/1999 | Furukawa et al. |

FOREIGN PATENT DOCUMENTS

| JP | 10-29246 | * | 2/1998 |

* cited by examiner

Primary Examiner—Robert Dawson
Assistant Examiner—Kuo-Liang Peng
(74) Attorney, Agent, or Firm—Sughrue Mion, PLLC

(57) ABSTRACT

A gelcoat composition composed of a base resin having double bonds in a molecule and a modified silicone oil having double bonds in a molecule. The gelcoat composition is inexpensive and yet highly stainproof. It is suitable for application to bathroom waterproof panels, etc.

6 Claims, No Drawings

GELCOAT COMPOSITION

BACKGROUND OF THE INVENTION

The present invention relates to a stainproof gelcoat composition that can be effectively applied to bathrooms, lavatory dressers, kitchens, etc. in water section.

Bathrooms, lavatory dressers, kitchens, etc. in water section are subject to pinky or brown slimy mildew. Bathroom walls, floor, and ceiling are also subject to black or brown mold. Such mildew and mold make people to feel unpleasant because of their appearance and touch as the living standard rises and the concept of comfortableness prevails. The slimy matter occurs near drains and water passages where a small amount of water stays at all times. It cannot be removed simply by pouring water. In addition, mold growing on walls and joints in bathrooms can be usually removed only by the aid of strong chlorine-based chemicals. Such chemicals are undesirable from the standpoint of safety and environmental protection.

One way to repel microbial attack is to coat objects with a gelcoat composition. A gelcoat composition is a liquid composition composed of one or more thermosetting resins (such as unsaturated polyester resin, vinyl ester resin, thermosetting acrylic resin, epoxy resin, and phenolic resin) and additives (such as pigment and hardening accelerator). It is applied to a mold surface by spraying or brushing prior to molding FRP products or artificial marbles by adding a polymerization initiator. It is also applied directly to molded articles. It imparts a good appearance (such as gloss and color) to FRP products and it also protects them from cold water, hot water and ultraviolet rays.

Attempts have been made to protect kitchen walls and tiles from staining by means of fluorine coating or photocatalytic reaction. Unfortunately, fluorine coating is expensive and presents difficulties in its application to intricately shaped products. In addition, its coating film is not strong enough to warrant long-term durability without peeling from substrates. The photocatalytic reaction can be applied to outdoor objects exposed to intense ultraviolet rays, whereas it cannot be applied to indoor objects (such as bathrooms) exposed to very weak ultraviolet rays.

SUMMARY OF THE INVENTION

The present invention was completed in view of the foregoing. It is an object of the present invention to provide a satinproof gelcoat composition which is inexpensive, applicable to intricately shaped objects, superior in long-term durability, and effective indoor (such as bathrooms) without ultraviolet rays.

The present inventors carried out extensive studies on a gelcoat composition. As the result, they solved the above-mentioned problems by using a gelcoat composition which is composed of a base resin (such as unsaturated polyester resin, vinyl ester resin, and thermosetting acrylic resin) having double bonds in a molecule and a modified silicone oil having double bonds in a molecule.

DETAILED DESCRIPTION OF THE PREFERRED EMBODIMENTS

The gelcoat composition of the present invention is composed of a base resin having double bonds in a molecule and a modified silicone oil having double bonds in a molecule.

The above-mentioned base resin is not specifically restricted so long as it has double bonds in a molecule; however, it is preferably exemplified by unsaturated polyester resin, vinyl ester resin, and thermosetting acrylic resin which have been commonly used for gelcoat compositions. Particularly preferred examples are given below. The unsaturated polyester resin includes those of ortho-, iso-, tere-, and bis-type. The ortho-type one is produced from a saturated dibasic acid (such as orthophthalic acid), an unsaturated basic acid (such as maleic anhydride and fumaric acid), and a glycol (such as propylene glycol, ethylene glycol, diethylene glycol, dipropylene glycol, and neopentyl glycol). It has ester linkages formed between the acid component (saturated and unsaturated dibasic acids) and the glycol component. In the iso-type and tere-type ones, the saturated basic acid is isophthalic acid and terephthalic acid, respectively. In the bis-type one, ester linkages are formed from an unsaturated dibasic acid (such as fumaric acid and maleic anhydride) and a glycol (such as dihydroxypropyl bisphenol A, hydrogenated bisphenol A, propylene glycol, ethylene glycol, diethylene glycol, dipropylene glycol, and neopentyl glycol).

The vinyl ester resin is a compound whose main chain is an addition product of an epoxy resin and an unsaturated monobasic acid (such as acrylic acid). It is divided into vinyl ester of bisphenol A type, vinyl ester of brominated bisphenol A type, and vinyl ester of novolak type. It has a three-dimensional structure formed by the reaction of an unsaturated polyester resin and vinyl ester resin with styrene in the presence of methyl ethyl ketone peroxide.

The thermosetting acrylic resin is available in various kinds as listed below.

One which is formed by introducing hydroxyl groups into an acrylic resin and then reacting the-hydroxyl groups with amino resin or isocyanate, thereby forming the three-dimensional structure.

One which is formed by curing a polyether (whose molecules are terminated with unsaturated monobasic acid such as acrylic acid) with a polyfunctional acrylate.

One which is formed from an acrylic resin copolymerized with glycidyl acrylate by curing with a compound having a carboxyl group, anhydride group, hydroxyl group, or silanol group.

One which is formed from an acrylic resin copolymerized with maleic anhydride or itaconic anhydride by curing with a compound having hydroxyl groups or epoxy groups.

One which is formed from an acrylic resin copolymerized with 2-isopropenyl-2-oxazoline or 2-vinyloxazoline by curing with a compound having a carboxyl group, anhydride group, phenol group, thiol group, epoxy group, amide group, or amino group.

One which is formed from an acrylic resin copolymerized with a trialkoxyvinylsilane by curing with water.

One which is formed from an acrylic resin having a siloxy group, active methylene group, methoxy group, or carboxyl group by curing with a compound having functional groups reactive with said groups.

The silicone oil having double bonds in a molecule should preferably be one which has acrylic groups and/or methacrylic groups in a molecule. Preferred examples include those which are represented by the structural formula shown below. They are characterized in that the main chain is polydimethylsiloxane and one terminal thereof is an acryl group or methacryl group.

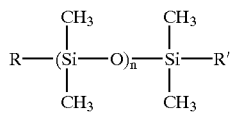

(where R denotes an alkyl group such as methyl group and butyl group, R' denotes a functional group having a double bond, such as acryl group or methacryl group as shown below; and n is a positive integer.)

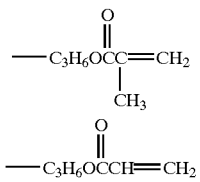

The modified silicone oil having double bonds in a molecule is one which has the structural formula shown below. It consists of main chains of polydimethylsiloxane and acryl groups and/or methacryl groups as side chains.

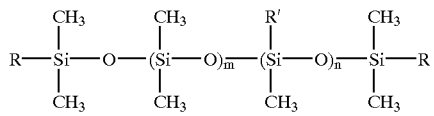

(where R denotes an alkyl group such as methyl group and butyl group, R' denotes a functional group having a double bond, such as acryl group or methacryl group, as shown above; and m and n are positive integers.)

The modified silicone oil having double bonds is incorporated into a base resin having double bonds in a molecule (such as unsaturated polyester resins, vinyl ester resin, and thermosetting acrylic resins) so as to form the gelcoat composition. When the gelcoat composition cures, the methacryl group having a double bond reacts with the double bonds in the base resin. Thus the inert lo polydimethylsiloxane molecule increases in concentration in the surface. This polydimethylsiloxane molecule exhibits strong water repellency, thereby making the gelcoat surface stainproof and easily cleanable. If the modified silicone oil is replaced by straight silicone oil (consisting entirely of inert polydimethylsiloxane without double bonds), the resulting gelcoat composition will not exhibit water repellency as desired unless it is incorporated with a large amount of silicone oil. In addition, the modified silicone oil should be one which is liquid at room temperature. It cannot be replaced by silicone resin or silicone rubber, which is solid at room temperature, although it resembles them in structure, because solids do not readily migrate to the surface.

The modified silicone oil having double bonds should have an adequate number-average molecular weight of 500 to 50,000. With an excessively large molecular weight, it has a high viscosity and hence does not migrate to the surface. With an excessively small molecular weight it is volatile and loses volatile-matter at the time of curing.

The amount of the modified silicone oil in the gelcoat composition should preferably be in the range of 0.1 to 10 parts by weight for 100 parts by weight of the base resin having double bonds in the molecule.

The gelcoat composition of the present invention may be incorporated with an adequate amount of organic peroxide as the polymerization initiator.

EXAMPLES

The invention will be described in more detail with reference to the following examples, which are not intended to restrict the scope thereof. In the example, "parts" means "parts by weight".

Example 1

A gelcoat composition was prepared from 100 parts of base resin (unsaturated polyester resin) and 0.5 parts of modified silicone oil having double bonds (modified silicone oil having a reactive methacryl group at one terminal) with a number-average molecular weight of 4,600. After incorporation with 1.0 part of methyl ethyl ketone peroxide (as a polymerization initiator), the gelcoat composition was sprayed (0.3 mm thick) onto an FRP mold which had previously coated with a mold release. After drying at 40° C. for 40 minutes, the coating film was sprayed with an FRP resin composition composed of glass mat, unsaturated polyester resin, and methyl ethyl ketone peroxide (as a polymerization initiator) so as to form a layer about 3 mm thick. The layer was cured at 80° C. for 3 hours and then demolded. Thus there was obtained an FRP board with gelcoat film.

Example 2

A gelcoat composition was prepared from 100 parts of base resin (unsaturated polyester resin) and 0.5 parts of modified silicone oil having double bonds (acryl-modified silicone oil having an acryl group at one terminal of the main chain of polydimethylsiloxane) with a number-average molecular weight of 6,000. After incorporation with 1.0 art of methyl ethyl ketone peroxide (as a polymerization initiator), the gelcoat composition was used to form gelcoat film in the same way as in Example 1.

Example 3

A gelcoat composition was prepared from 100 parts of base resin (vinyl polyester resin) and 0.5 parts of modified silicone oil having double bonds (acryl-modified silicone oil having an acryl group same as one in Example 2 at one terminal of the main chain of polydimethylsiloxane) with a number-average molecular weight of 6,000. After incorporation with 1.0 part of methyl ethyl ketone peroxide (as a polymerization initiator), the gelcoat composition was used to form gelcoat film in the same way as in Example 1.

Example 4

A gelcoat composition was prepared from 100 parts of base resin (thermosetting acrylic resin) and 0.5 parts of modified silicone oil having double bonds (acryl-modified silicone oil having an acryl group same as one in Example 2 at one terminal of the main chain of polydimethylsiloxane) with a number-average molecular weight of 6,000. After incorporation with 1.0 part of methyl ethyl ketone peroxide (as a polymerization initiator), the gelcoat composition was used to form gelcoat film in the same way as in Example 1.

Comparative Example 1

A gelcoat composition was prepared from the same materials as used in Example 1, except for the modified silicone oil having double bonds. This gelcoat composition was used to form gelcoat film in the same way as in Example 1.

The FRP board with gelcoat film was tested for contact angle and cleanability (in terms of the ease with which felt pen ink is wiped off).

Measurements of Contact Angle

Contact angle of water was measured with a contact angle meter made by Kyowa Kaimen Kagaku Co., Ltd. An average of three measurements for each sample is shown below.

TABLE 1

|  | Example 1 | Example 2 | Example 3 | Example 4 | Comparative Example 1 |
|---|---|---|---|---|---|
| Contact angle | 101° | 103° | 95° | 97° | 85° |

Wiping Test

Each sample was smeared with felt pen ink. After drying the smeared surface was wiped off.

TABLE 2

|  | Example 1 | Example 2 | Example 3 | Example 4 | Comparative Example 1 |
|---|---|---|---|---|---|
| Cleanability | good | Good | good | good | Impossible to wipe off |

It is noted from Tables 1 and 2 that those samples in Examples 1 to 4 gave a contact angle larger than 90°, indicating their high water repellency, and showed good cleanability, whereas the sample in Comparative Example 1 gave a contact angle of 85° and did not permit felt pen ink to be wiped off.

The present invention provides a gelcoat composition which is inexpensive and yet highly stainproof. It is suitable for application to bathroom waterproof panels, kitchen counters, and trap covers.

What is claimed is:

1. A gelcoat composition which comprises a base resin having double bonds in a molecule and a modified silicone oil having double bonds in a molecule, wherein the modified silicone oil having double bonds in a molecule is one which has acryl groups and/or methacryl groups as side chains attached to a main chain of polydimethylsiloxane.

2. A gelcoat composition according to claim 1, wherein the base resin is one which selected from unsaturated polyester resin, vinyl ester resin, and thermosetting acrylic resin.

3. A gelcoat composition according to claim 1 or 2, which is composed of 100 parts by weight of the base resin having double bonds in the molecule and 0.1 to 10 parts by weight of the modified silicone oil having double bonds in the molecule.

4. A gelcoat composition which comprises a base resin having double bonds in a molecule and a modified silicone oil having double bonds in a molecule, wherein the modified silicone oil having double bonds in a molecule is one which has an acryl group or a methacryl group attached to only one terminal of a main chain of polydimethylsiloxane.

5. A gelcoat composition according to claim 4, wherein the base resin is one which is selected from unsaturated polyester resin, vinyl ester resin, and thermosetting acrylic resin.

6. A gelcoat composition according to claim 4 or 5, which is composed of 100 parts by weight of the base resin having double bonds in the molecule and 0.1 to 10 parts by weight of the modified silicone oil having double bonds in the molecule.

* * * * *